(12) United States Patent
Dowling (10) Patent No.: US 6,182,842 B1
(45) Date of Patent: Feb. 6, 2001

(54) BIN FILLING CHUTE

(76) Inventor: Christopher P. Dowling, 304 N. Main St., Apt. G, Reeseville, WI (US) 53579

( * ) Notice: Under 35 U.S.C. 154(b), the term of this patent shall be extended for 0 days.

(21) Appl. No.: 09/418,305

(22) Filed: Oct. 14, 1999

(51) Int. Cl.$^7$ ........................................................ A47F 5/00
(52) U.S. Cl. .................... 211/126.2; 211/10; 193/2 R; 193/2 A; 312/117; 312/124
(58) Field of Search ..................... 193/2 R, 2 A, 193/3, 15; 211/10, 126.16, 126.2; 312/117, 121, 124; D7/691; 470/180

(56) References Cited

U.S. PATENT DOCUMENTS

| | | |
|---|---|---|
| 423,743 | * 3/1890 | Durler . |
| 1,477,428 | * 12/1923 | Corbett . |
| 1,627,084 | * 5/1927 | Fritz . |
| 4,800,875 | * 1/1989 | Ray .................................. 193/2 R X |
| 5,781,443 | * 7/1998 | Street et al. . |

* cited by examiner

Primary Examiner—Robert W. Gibson, Jr.
(74) Attorney, Agent, or Firm—Donald Cayen

(57) ABSTRACT

A bin filling chute is useful for filling the compartments of a parts storage bin and also for filling stackable singular compartments, as well as compartments having a lip of some sort. The filling chute has a floor with upstanding side walls. A brace projects transversely from the floor. A leg of the brace makes a predetermined angle of approximately 45 degrees with the floor. The chute first end is placed inside a selected compartment to be filled. The brace leg is inserted into the vertical spaces between the compartment side partitions and the front barrier of the selected compartment. The chute floor then makes the predetermined angle with the compartment bottom wall. Small components dropped onto the chute floor at its second end slide by gravity along the floor to fill the selected compartment. In a modified embodiment, the chute has hooks that are generally coplanar with the brace leg. The hooks support the chute on the barrier of the next higher compartment. The brace leg is in contact with the side partitions of the compartment and cooperate with the hooks to orient the chute floor at the predetermined angle.

26 Claims, 8 Drawing Sheets

BIN FILLING CHUTE

BACKGROUND OF THE INVENTION

1. Field of the Invention

This invention pertains to material handling, and more particularly to apparatus that facilitates handling small parts.

2. Description of the Prior Art

Pins, fasteners, washers, and similar components constitute a vital part of many manufactured assemblies. Consequently, for efficient production an adequate supply of such components must always be readily at hand.

It is well known for assembly plants to include shelves and cabinets of different sizes and shapes for storing small components. For example, large metal bins arranged into individual compartments are in widespread use. Each compartment has top, bottom, and back walls and two side partitions. The front of each compartment has a short barrier adjacent the bottom wall that partially closes an otherwise open front of the compartment. When the compartments have been stocked with the various components, workers have ready access to the components through the compartment open fronts. Storage bins of a wide variety of sizes and numbers of compartments are commercially available.

A problem associated with bin-type compartments is that they are difficult to stock with the desired components. Specifically, the components must be manually transferred from bulk containers to the correct compartments. The usual transfer method is by hand. A person grabs a handful of components from the bulk container, places his filled hand inside a compartment, and then drops the components onto the compartment bottom wall. That process is slow and costly. Depending on the size of the compartments and the number of components to be stocked in them, the person must perform the grab and drop procedure numerous times to fill a compartment. Invariably, the person drops some of the components, which means that more unproductive time is required to pick them up from the floor or perhaps from a lower compartment. Trying to force feed the components directly from the bulk container into a compartment usually does not work. Some of the force fed components inevitably miss the desired compartment and land either on the floor or in an adjacent compartment.

Thus, a need exists for improvements in the way storage bins are stocked.

SUMMARY OF THE INVENTION

In accordance with the present invention, a bin filling chute is provided that greatly aids in transferring small components from bulk containers to the compartments of a parts storage bin. This is accomplished by apparatus that includes an angled floor that extends from outside a compartment to inside the compartment.

A pair of side plates upstand from the edges of the floor. There may be an end plate at the outside end of the floor. The end plate and the two side plates cooperate to form a filling station at the floor outside end. The end plate and the side plates may be supplied with upwardly diverging funnel plates.

Under the floor is a brace. The brace projects transversely beyond the floor. The brace has a leg that makes an angle of approximately 55 degrees to 65 degrees with the floor.

It is a feature of the invention that it can be used to fill all the compartments of the parts storage bin. The inside end of the filling chute floor is placed inside the compartment to be filled. The brace leg is placed against the two vertical partitions that bound the sides of the compartment. Since the bin partitions are substantially vertical, the filling chute floor makes an angle of approximately 55 degrees to 65 degrees with the vertical, with the floor outside end being higher than the floor inside end. The filling chute is slid downwardly to insert the brace leg into spaces between the compartment vertical partitions and barrier. The filling chute is then cantilever supported in the parts storage bin.

The components to be transferred to the compartment are dropped into the chute filling station. The components slide by gravity along the floor and drop into the compartment. When the compartment is filled, the filling chute is slid upwardly to disengage the brace leg from the spaces between the compartment partitions and barrier. The filling chute is then ready to fill another compartment.

In a modified embodiment, the bin filling chute is supported on the parts storage bin by a hook as well as by the brace. The hook is designed to engage the barrier of the compartment immediately above the compartment to be filled. The engagement area of the hook lies in generally the same plane as the brace leg. In a preferred construction, the hook is fabricated as an angle that spans the side plates. The hook has a depending lip that may be generally parallel to the plane of the brace leg.

To fill a first compartment using the modified bin filling chute, the chute floor inside end is placed inside the first compartment. The hook is located above the barrier at the front of a second compartment directly above the first compartment, and the brace leg is placed in contact with the vertical partitions of the first compartment. The filling chute floor then makes an angle of between about 25 degrees and 35 degrees with the horizontal. The filling chute is slid downwardly such that the hook engages and rests on the barrier of the second compartment. The filling chute is then supported on the part storage bin. The components are dropped into the chute filling station, and they slide down the floor to fill the first compartment.

The hook is not used when filling the top row of compartments of a parts storage bin. In that case, the brace leg is inserted into the spaces between the side partitions and the barrier of the compartment. The bin filling chute is thus always cantilever supported when filling the top row of bin compartments.

The method and apparatus of the invention, using an angled floor that extends from outside to inside a parts storage bin, thus enables rapid and convenient filling of individual compartments of the bin. The filling chute can be used with all rows of compartments of a part storage bin, even though the filling chute must be supported in a different way to fill the top row of compartments.

Other advantages, benefits, and features of the present invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
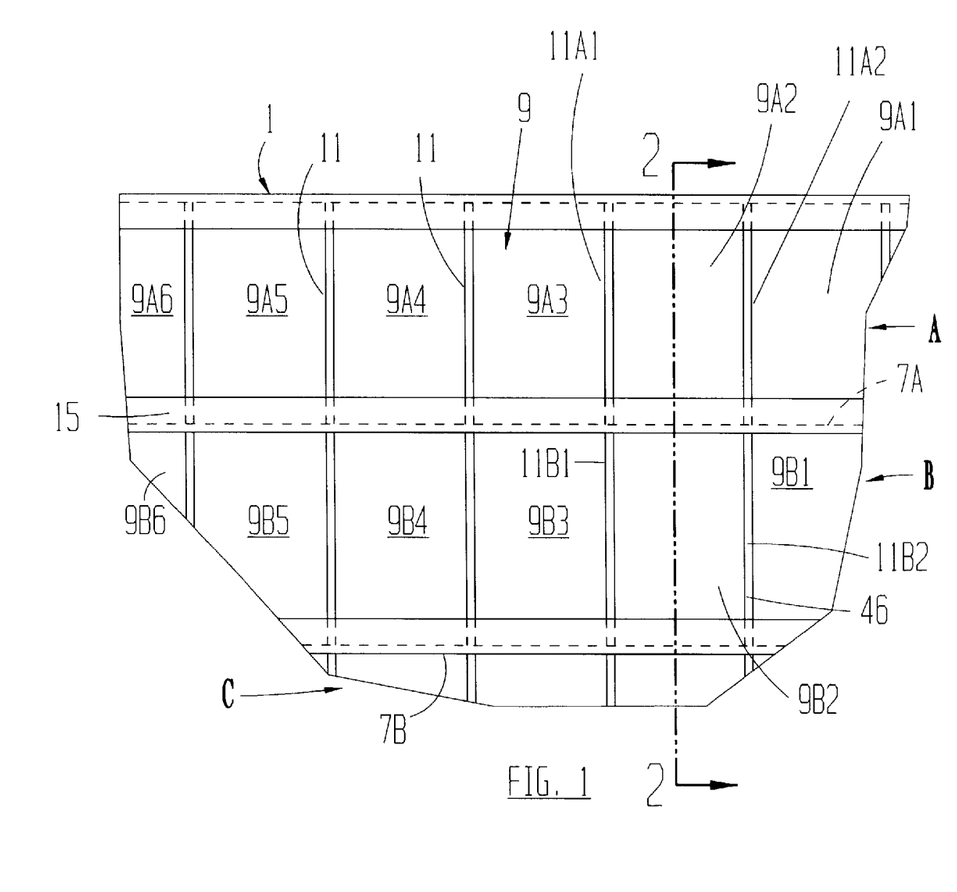
FIG. 1 is a partial front view of a typical parts storage bin with which the bin filling chute of the invention is advantageously used.
Figure 2:
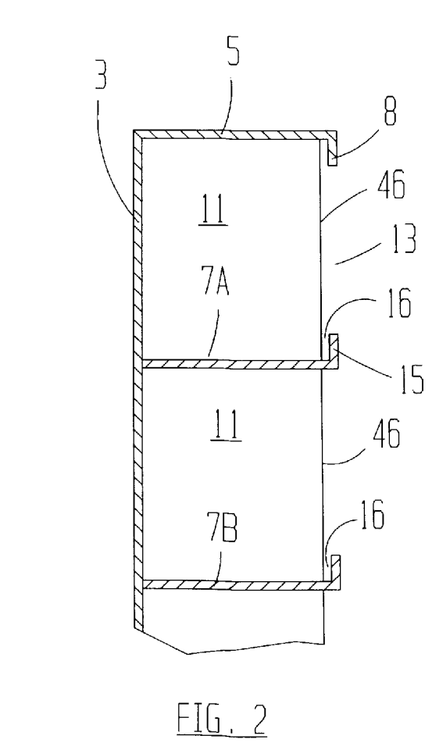
FIG. 2 is a cross-sectional view along line 2—2 of FIG. 1.

Referring to FIGS. 1 and 2, a portion of a typical parts storage bin 1 is illustrated with which the present invention is advantageously used. However, it will be understood that the invention is not limited to use with equipment dedicated to storage purposes.

Briefly by way of background, the part storage bin 1 has a vertical back wall 3, a top wall 5, and a number of horizontal shelves. Two shelves 7A and 7B are shown. Depending from the top wall 5 at the front of the bin is a short overhang 8. The shelves divide the bin into a number of horizontal rows, such as rows A, B, and C. Each row A, B, C is divided into a number of compartments, generally indicated by reference numeral 9, by vertical partitions 11. For example, in the bin row A shown, there are compartments 9A1, 9A2, 9A3, 9A4, 9A5, and 9A6. In the row B, there are similar compartments 9B1, 9B2, 9B3, 9B4, 9B5, and 9B6 arranged in columns under the corresponding compartments in row A. It is seen that the shelf 7A simultaneously functions as a bottom wall for the compartments in row A and as a top wall for the compartments in row B. Similarly, the shelf 7B simultaneously functions as a bottom wall for the compartments row B and as a top wall for the compartments in row C. Representative compartment 9A2 is bounded on its two sides by vertical side partitions 11A1 and 11A2. Representative compartment 9B2 is bounded on its two sides by side partitions 11B1 and 11B2. Each compartment 9 is thus bounded on five sides and has an open front 13.

A short barrier 15 upstands from each shelf to partially close the associated compartment open front 13. The vertical side partitions 11 do not contact the associated barriers 15. Rather, there is a vertically oriented space 16 between the exposed edges 46 of the partitions and the associated barrier.

Figure 3:
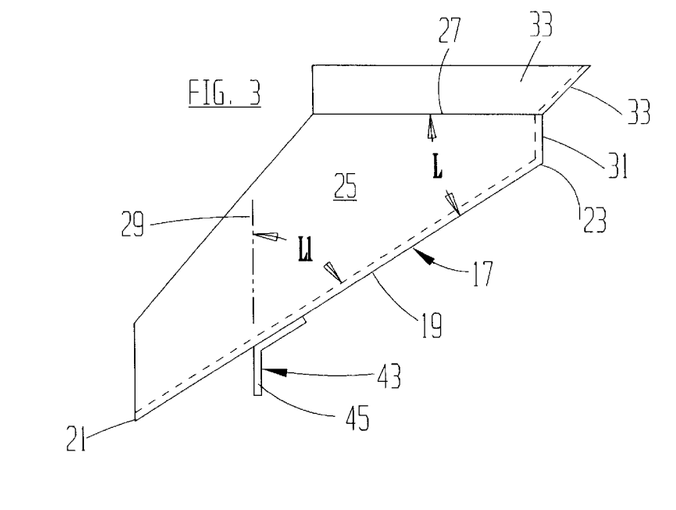
FIG. 3 is a side view of the bin filling chute of the invention.
Figure 4:
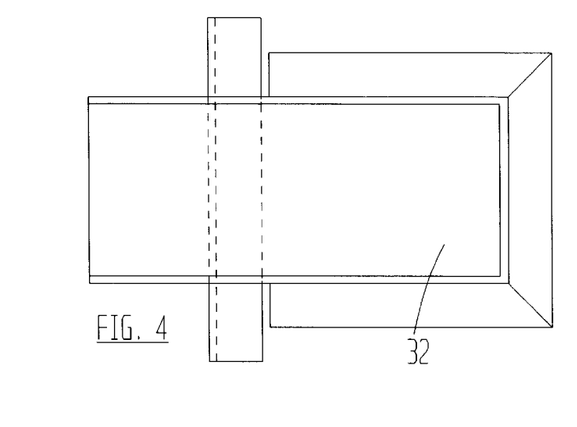
FIG. 4 is a top view of FIG. 3.
Figure 5:
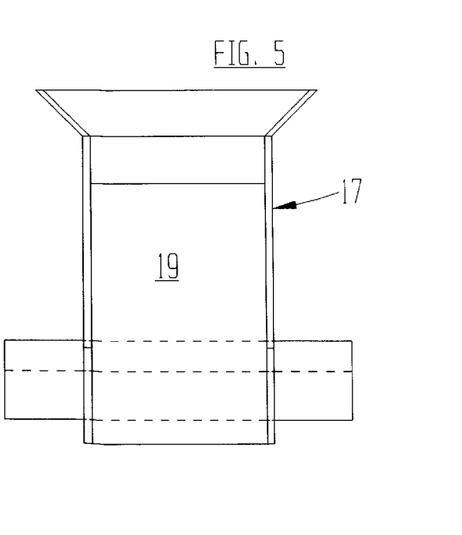
FIG. 5 is an end view of FIG. 3.

In accordance with the present invention, the compartments 9 of the parts storage bin 1 are filled in a quick and efficient manner by a bin filling chute 17, FIGS. 3–5. In the particular construction shown, the bin filling chute 17 is made as a steel weldment, but other construction materials, such as propylene plastic, are also suitable. The bin filling chute is comprised of a floor 19 having an inside end 21 and an outside end 23. A pair of side plates 25 upstand from the floor 19. The side plates 25 have respective top edges 27. The plane of the side plate top edges 27 makes an acute angle L of approximately 55 degrees to 65 degrees with the floor. There is a short end plate 31 at the floor outside end 23. Upwardly diverging funnel plates 33 are joined to the top edges of the side and end plates 25 and 31, respectively. The side and end plates cooperate with the funnel plates 33 to form a filling station 32 above the floor near its outside end.

The bin filling chute 17 further comprises a brace 43 that is secured to the floor 19 and projects transversely from it. The brace 43 has a sturdy leg 45. The leg 45 defines a plane 29 that makes the angle L with the floor. The brace leg 45 is considerably closer to the floor inside end 21 than to the floor outside end 23.

The bin filling chute 17 can be used to fill all of the compartments 9 of the parts storage bin 1, FIGS. 1 and 2. Looking at FIGS. 6 and 7, the bin filling chute is shown in use to fill a lower compartment, such as compartment 9B2, of the storage bin. For that purpose, the bin filling chute is positioned such that the inside end 21 of the floor 19 is inside the compartment 9B2. The leg 45 of the brace 43 is placed against the exposed ends 46B of the vertical partitions 11B1 and 11B2. The bin filling chute is then slid downwardly to insert the brace leg into the spaces 16B between the barrier 15B and the partitions 11B1 and 11B2. The bin filling chute is thus held to the part storage bin in cantilever fashion by means of the brace, and the floor makes the complement of the angle L with the bottom wall of the compartment 9B2.

Figure 6:
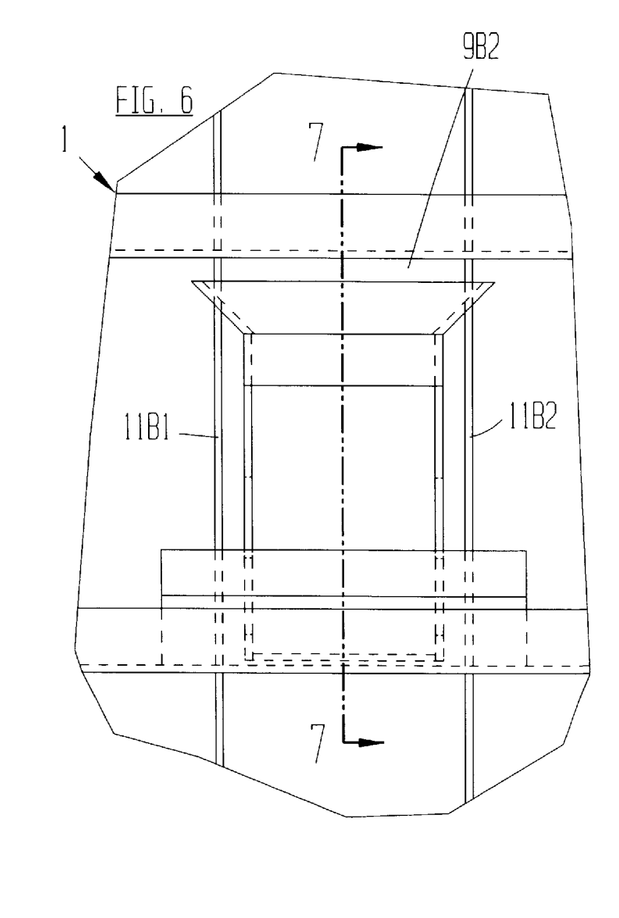
FIG. 6 is a front view of the bin filling chute in use to fill a lower compartment of a parts storage bin.
Figure 7:
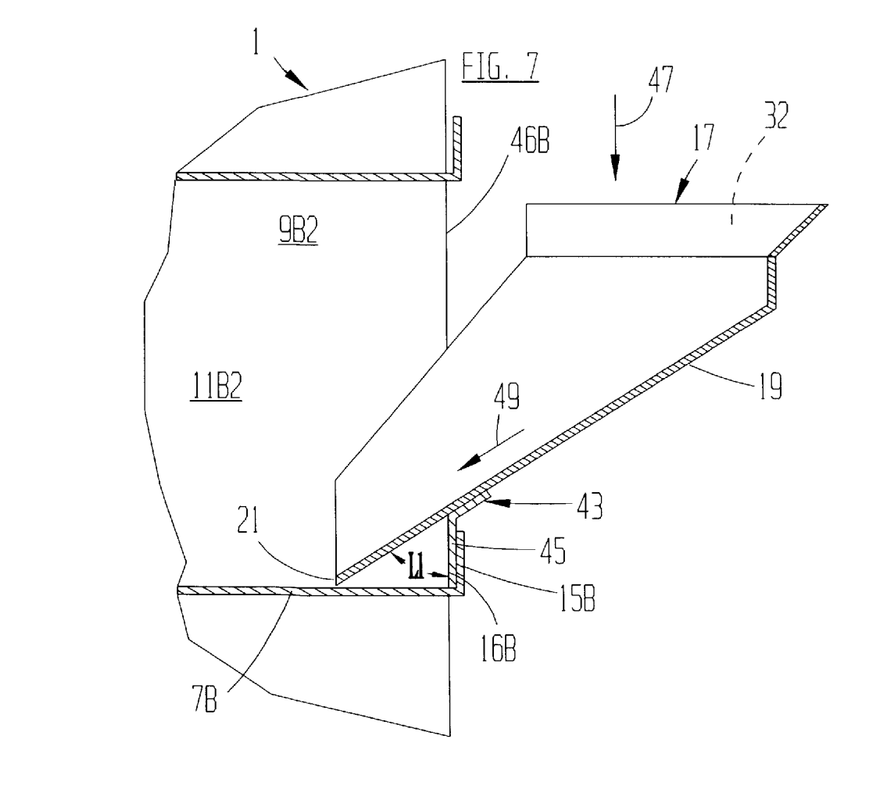
FIG. 7 is a cross-sectional view taken along line 7—7 of FIG. 6.

A person drops small components, not shown, into the filling station 32. The components fall by gravity in the direction of arrow 47 onto the chute floor 19. The components slide along the floor in the direction of arrow 49 and then fall to the bottom wall of the compartment 9B2 formed by the shelf 7B.

When the bin compartment 9B2 has the desired number of components loaded into it, the bin filling chute 17 is pulled upwardly to disengage the brace leg 45 from the bin spaces 16B. The bin filling chute is then ready to be used to fill another compartment 9.

Figure 8:
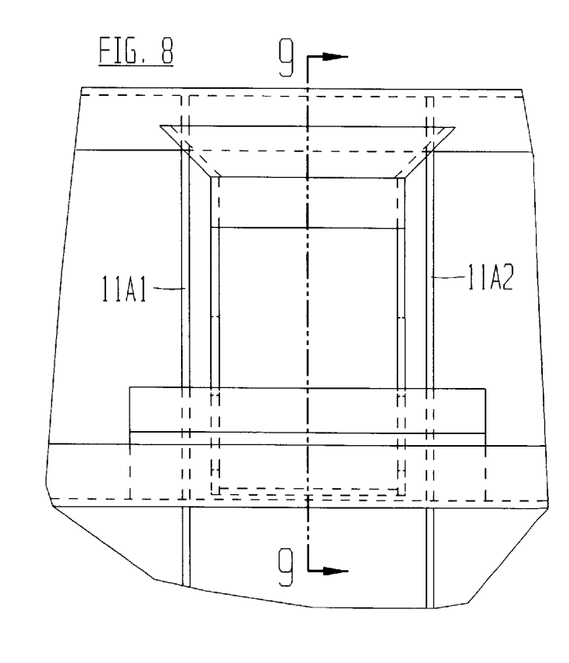
FIG. 8 is a view similar to FIG. 6, but showing the bin filling chute in use to fill a compartment in the top row of a parts storage bin.
Figure 9:
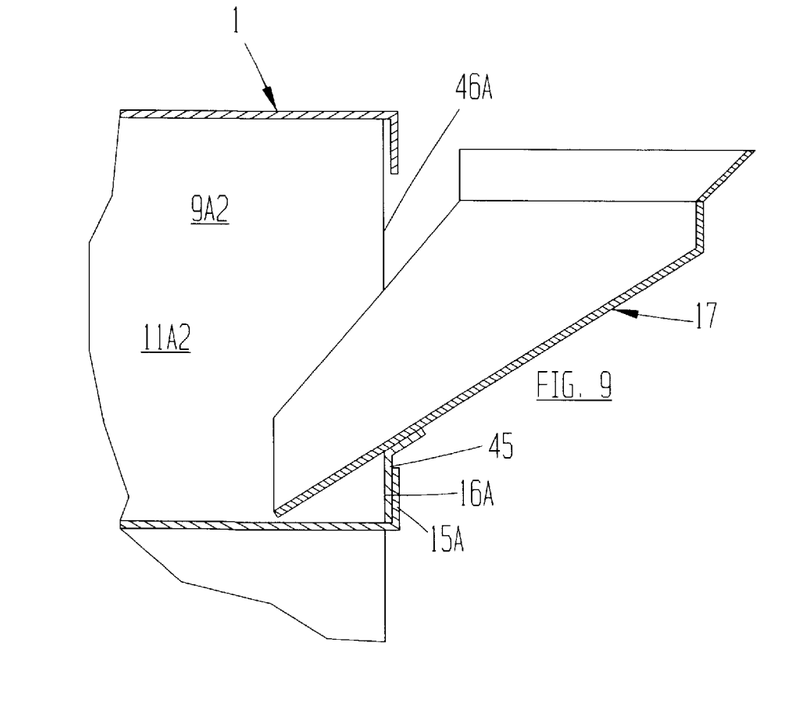
FIG. 9 is a cross-sectional view taken along line 9—9 of FIG. 8.

Turning to FIGS. 8 and 9, the bin filling chute 17 is shown in use to fill a compartment, such as compartment 9A2, of the top row A of compartments in the parts storage bin 1. When filling the top row of compartments, the bin filling chute is cantilever supported on the part storage bin in the same manner as when filing a lower row B of compartments. That is, the brace leg 45 is inserted into the spaces 16A between the vertical edges 46A of the compartment side partitions 11A1, 11A2 and the barrier 15A.

Figure 10:
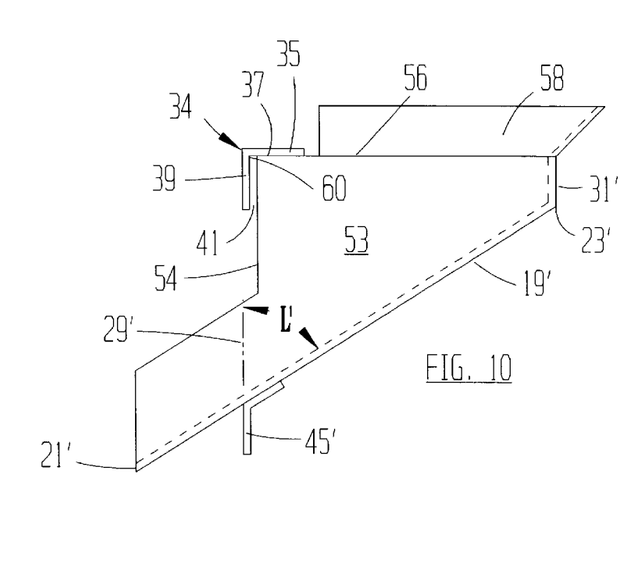
FIG. 10 is a side view of a modified embodiment of the invention.
Figure 11:
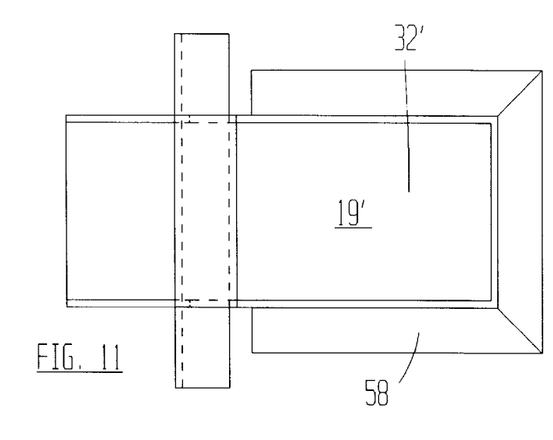
FIG. 11 is a top view of FIG. 10.
Figure 12:
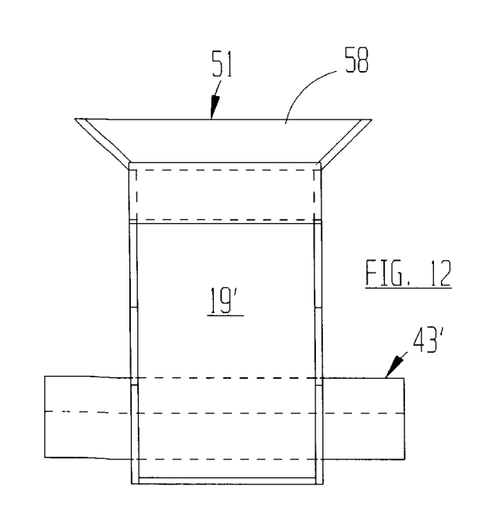
FIG. 12 is an end view of FIG. 10.

FIGS. 10–12 show a modified bin filling chute 51. The bin filling chute 51 has a floor 19', end plate 31', side plates 53, and a brace 43'. The brace leg 45' lies in a plane 29' that makes an angle L' of between approximately 40 degrees and 50 degrees with the floor 19'. The side plates 53 and the end plate 31' define a filling station 32' above the floor 19'near its outside end 23'. The side plates 53 have respective top edges 56, and the end plate 31' has a similar top edge. Upwardly diverging funnel plates 58 are joined to the top edges of the side and end plates 53 and 31', respectively.

As illustrated, the two side plates 53 of the bin filling chute 51 have respective front edges 54 that are generally parallel to the plane 29' of the brace leg 45'. However, it will be appreciated that the side plate front edges 54 need not be parallel to the plane 29'.

The bin filling chute 51 further comprises a hook 34. In the preferred embodiment, the hook 34 is in the form of a member 35 that spans the side plates 53. A leg 37 of the member 35 is joined to the side plate top edges 56. To make room for the hook 34, the funnel plates 58 do not reach to the side plate front edges 54. There is a lip 39 on the member 35 that is spaced from the side plate front edges. A contact area 60 at the junction of the hook leg 37 and the lip 39 lies generally in the plane 29'. The lip 39 and the side plate front edges cooperate to form a pair of aligned spaces 41. Although not shown, two short members, one welded or otherwise joined to each side plate 53, can be used instead of the single member 35 shown.

Figure 13:
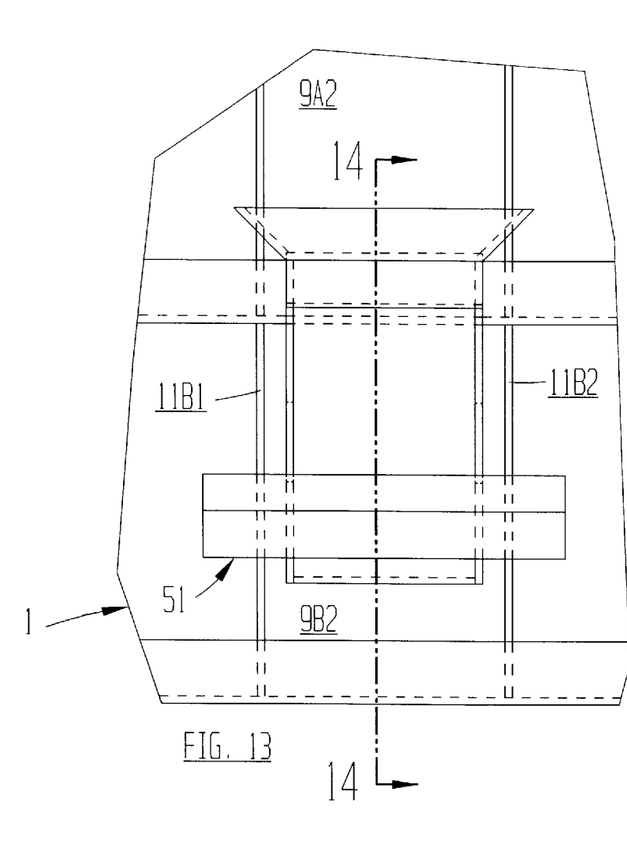
FIG. 13 is a front view of the bin filling chute of FIGS. 10–12 in use to fill a compartment in a lower row of a parts storage bin.
Figure 14:
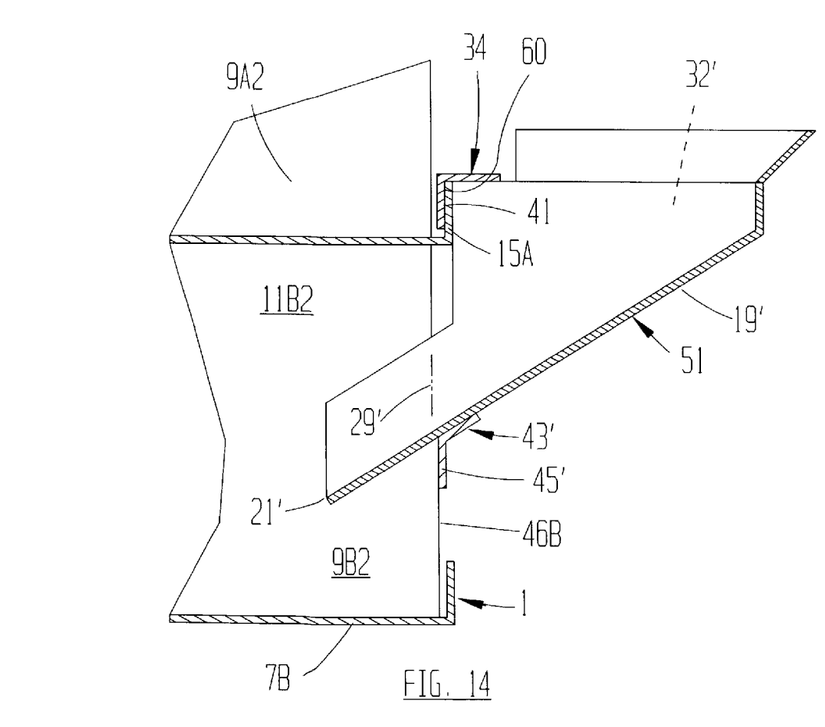
FIG. 14 is a cross-sectional view taken along line 14—14 of FIG. 13.

The bin filling chute 51 can be used to fill all the compartments 9 of a parts storage bin 1, FIGS. 1 and 2. Looking at FIGS. 13 and 14, the bin filling chute 51 is shown in use to fill a lower compartment, such as compartment 9B2, of the storage bin 1. The inside end 21' of the bin filling chute floor 19' is located inside the compartment 9B2. The hook 34 is located above the barrier 15A of the next higher compartment 9A2. The leg 45' of the brace 43' is placed against the exposed edges 46B of the vertical partitions 11B1 and 11B2. Then the bin filling chute is lowered until the hook contact area 60 rests on the barrier 15A. That is, the barrier 15A enters the spaces 41 of the filling chute. At that point, the filling chute is supported on the storage bin, with the filling station 32' outside of the bin, and the floor inside end 21' inside the bin compartment 9B2. Because the hook contact area 60 lies in the plane 29', the floor 19' makes the complement of the angle L' with the compartment bottom wall. A person drops the desired components into the filling station 32'. The components slide by gravity down the floor 19' to fill the compartment 9B2.

Figure 15:
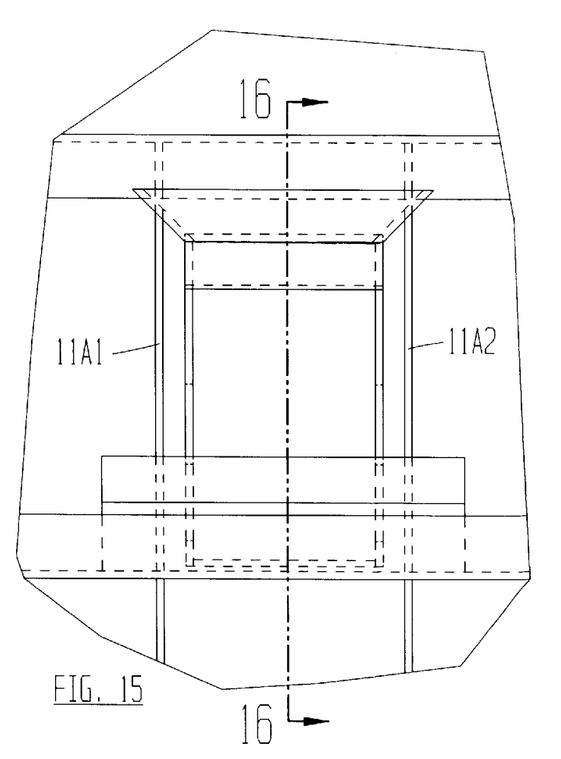
FIG. 15 is a front view of the bin filling chute of FIGS. 10–12 in use to fill a compartment in the top row of a parts storage bin.
Figure 16:
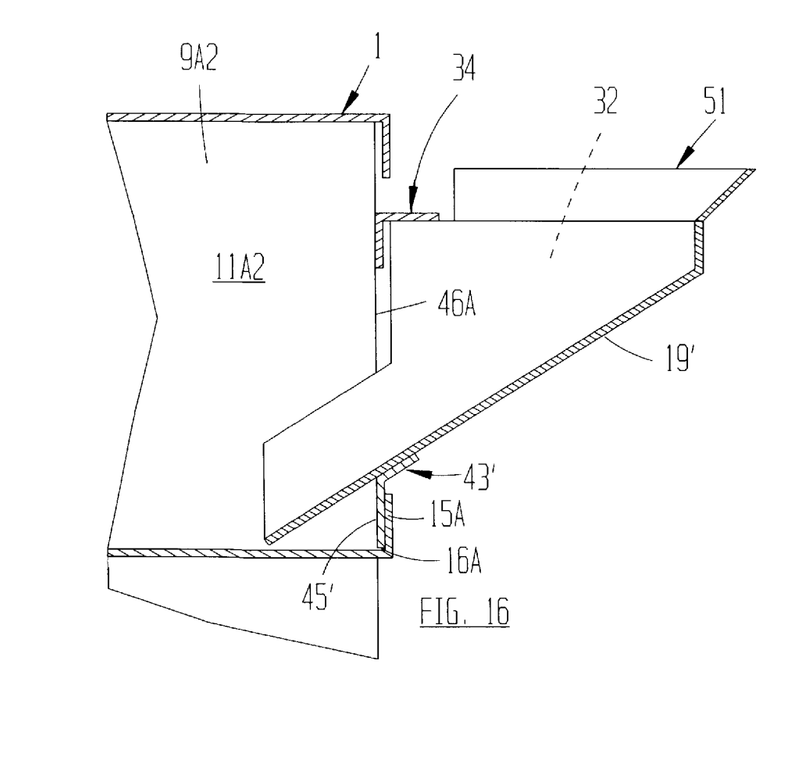
FIG. 16 is a cross-sectional view taken along line 16—16 of FIG. 15.

To fill a compartment, such as compartment 9A2, of the top row A of the parts storage bin 1, the bin filling chute 51 is cantilever supported on the storage bin. FIGS. 15 and 16 show the leg 45' of the brace 43' inserted into the spaces 16A between the barrier 15A of the compartment 9A2 and the front edges 46A of the side partitions 11A1 and 11A2. The hook 34 is thus not used when filling a compartment in the top row of the storage bin compartments.

Figure 17:
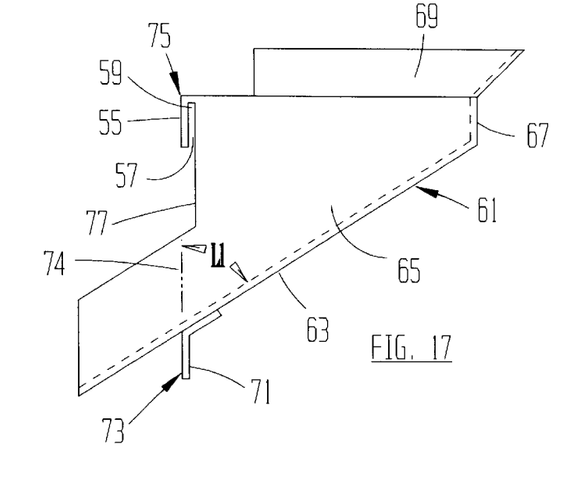
FIGS. 17–19 are side, top, and end views, respectively, of an alternate construction of the bin filling chute.
Figure 18:
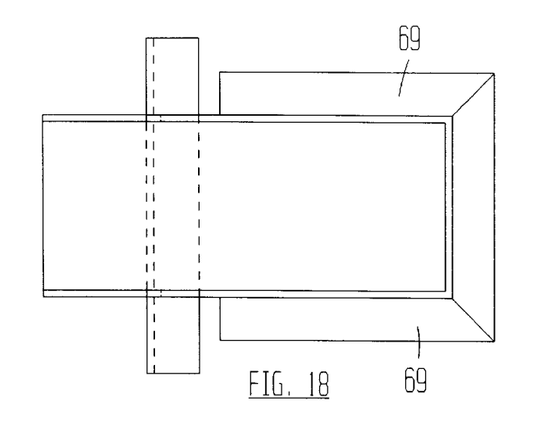
Figure 19:
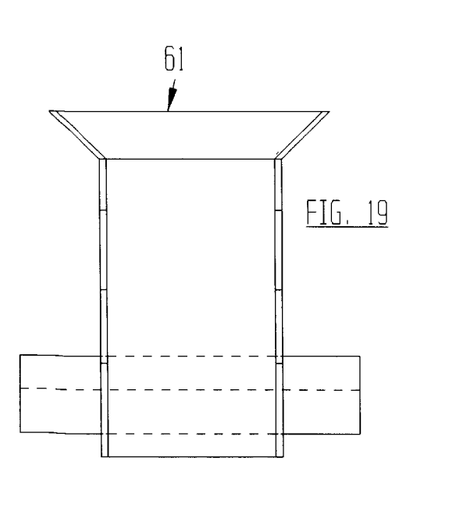

Now turning to FIGS. 17–19, an alternate bin filling chute 61 has a floor 63, side plates 65, a back plate 67, and upwardly diverging funnel plates 69. A leg 71 of a brace 73 lies in a plane 74 that makes an angle of between approximately 55 degrees and 65 degrees with the floor 63.

The bin filling chute 61 further comprises hooks 75 on the side plates 65. In the illustrated structure, the hooks 75 are in the form of generally L-shaped extensions 55 that project from the respective side plate front edges 77. The extensions 55 cooperate with the side plate front edges 77 to define a pair of coplanar spaces 57. A contact area 59 on each extension lies generally in the plane 74.

The bin filling chute 61 is used in substantially the same manner as the bin filling chute 51 described previously in connection with FIGS. 13–16. That is, to fill a selected lower row compartment 9, the hooks 75 engage the barrier 15 of the bin compartment directly above the selected compartment. Specifically, the hook contact areas 59 rest on the barrier of the compartment above the selected compartment. At the same time, the spaces 57 receive the barrier. Simultaneously, the brace leg 71 is against the exposed edges 46 of the selected compartment side partitions such that the floor 63 makes the complement of the angle L with the compartment bottom wall. When filling a compartment in the top row A of the parts storage bin 1, the brace leg 71 is used to cantilever support the filling chute 61 in the spaces 16A.

In addition to the multi-column parts storage bin 1, the bin filling chute of the invention is equally useful for filling any singular compartment that can be stacked or that has a lip of some sort. It will thus be recognized that the invention is not limited to use with any particular type of storage equipment.

In summary, the results and advantages of parts storage bins 1 can now be more fully realized. The bin filling chute provides both convenient filling of all compartments 9 of a storage bin as well as easy relocation of the filling chute between different compartments. This desirable results comes from using the combined functions of the brace and the floor. The brace leg is inserted into bin spaces 16 to cantilever support the filling chute with the floor inside end being inside the compartment 9 and the chute filling station being outside of the bin. The floor makes an angle relative to the horizontal. Small components are conveniently dumped into the filling station, from which they slide by gravity along the filling chute floor into the compartment. When the compartment is filled, the filling chute is easily disengaged from the bin for relocation to a different compartment. When a filling chute with a hook is used, the hook engages a bin barrier 15 above the compartment to be filled. Simultaneously, the brace is against the compartment side partitions to assure that the floor makes the desired angle with the horizontal. When filling a compartment 9 of the top row A of the storage bin with a filler chute having a hook, the brace leg is used to cantilever support the chute, and the hook is not used.

It will also be recognized that in addition to the superior performance of the bin filling chute, its construction is such as to be of modest cost. Also, since it is made of a simple design and of rugged construction, it gives long service life with no maintenance.

Thus, it is apparent that there has been provided, in accordance with the invention, a bin filling chute that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A bin filling chute comprising:
   a. a longitudinally extending floor having first and second ends;
   b. a pair of side plates upstanding from the floor, the side plates defining a filling station proximate the floor second end; and
   c. a brace secured to and projecting transversely from the floor past the side plates, the brace having a leg that lies in a plane that makes a predetermined angle of between approximately 55 degrees and 65 degrees with the floor.

2. The bin filling chute of claim 1 further comprising an end plate upstanding from the floor second end and cooperating with the side plates to define the filling station.

3. The bin filling chute of claim 2 further comprising funnel plates joined to and diverging upwardly from the side plates and the end plate.

4. The bin filling chute of claim 1 further comprising hook means for removeably supporting the bin filling chute on a parts storage bin.

5. The bin filling chute of claim 4 wherein the hook means comprises a member that spans and is joined to the side plates, the member having a contact area that lies generally in the plane of the brace leg.

6. The bin filling chute of claim 4 wherein the hook means comprises a member that spans and is joined to the side plates, the member having a lip that cooperates with the side plates to form a pair of aligned spaces, and wherein the aligned spaces lie generally in the plane of the brace leg.

7. The bin filling chute of claim 4 wherein the hook means comprises an extension fabricated on each side plate, the extensions having respective contact areas that lie generally in the plane of the brace leg.

8. The bin filling chute of claim 4 wherein the hook means comprises a generally L-shaped extension fabricated on each side plate, the extensions having respective lips that cooperate with the side plates to form a pair of aligned spaces, and wherein the lips of the extensions lie generally in the plane of the brace leg.

9. In combination with a parts storage bin having a first compartment with a first horizontal bottom wall, two first vertical side partitions, a first open front, and a first barrier upstanding from the first bottom wall that partially closes the first open front, the first vertical side partitions and the first barrier cooperating to define a pair of first generally vertical spaces; and a second compartment below the first compartment and having a second horizontal bottom wall, a second open front, two second vertical side partitions, and a second barrier upstanding from the second bottom wall and partially closing the second open front, the second partitions and the second barrier cooperating to define a pair of second generally vertical spaces, a chute for filling the first compartment comprising:
  a. a longitudinally extending floor having a first end inside the first compartment above the first bottom wall, and a second end outside the first compartment;
  b. a pair of side plates upstanding from the floor; and
  c. a brace secured to the floor and having a leg that defines a plane that makes a predetermined angle of between approximately 55 degrees and 65 degrees with the floor, the brace being inserted into the first vertical spaces such that the floor makes the predetermined angle with the first vertical spaces and the chute is cantilever supported on the storage bin,
    so that first selected components dropped on the chute floor adjacent the second end thereof slide along the floor and onto the first bottom wall to fill the first compartment.

10. The combination of claim 9 wherein the chute further comprises an end plate upstanding from the floor second end, the end plate and the side plates cooperating to define a filling station proximate the floor second end.

11. The combination of claim 10 wherein the chute further comprises upwardly diverging funnel plates on the side and end plates.

12. The combination of claim 9 wherein:
  a. the brace leg is removable from the first vertical spaces; and
  b. the chute leg is insertable into the second vertical spaces with the floor first end being inside the second compartment and the floor second end being outside the second compartment such that the floor makes the predetermined angle with the second vertical spaces and the chute is cantilever supported on the storage bin, so that second selected components dropped onto the chute floor adjacent the second end thereof slide along the floor and onto the second bottom wall to fill the second compartment.

13. In combination with a parts storage bin having a first compartment with a first horizontal bottom wall, two first vertical side partitions, a first open front, and a first barrier upstanding from the first bottom wall that partially closes the first open front, the first vertical side partitions and the first barrier cooperating to define a pair of first generally vertical spaces; and a second compartment below the first compartment and having a second horizontal bottom wall, a second open front, two second vertical side partitions, and a second barrier upstanding from the second bottom wall that partially closes the second open front, the second partitions and the second barrier cooperating to define a pair of second generally vertical spaces, a chute for filling the second compartment comprising:
  a. a longitudinally extending floor having a first end inside the second compartment above the second bottom wall, and a second end outside the second compartment;
  b. a pair of side plates upstanding from the floor;
  c. a brace secured to the floor and having a leg that defines a plane that makes a predetermined angle of between approximately 55 degrees and 65 degrees with the floor; and
  d. hook means for engaging the first barrier and for cooperating with the brace leg and the second side partitions to orient the chute floor to make the predetermined angle with the second bottom wall,
    so that first small components dropped onto the chute floor adjacent the second end thereof slide along the floor and onto the second bottom wall to fill the second compartment.

14. The combination of claim 13 wherein the chute further comprises an end plate upstanding from the floor second end, the end plate and the side plates cooperating to define a filling station proximate the floor second end.

15. The combination of claim 14 wherein the chute further comprises upwardly diverging funnel plates on the side and end plates.

16. The combination of claim 13 wherein the hook means comprises a member spanning and joined to the side plates, the member having a contact area that lies generally in the plane of the brace leg, the contact area resting on the first barrier to support the chute on the parts storage bin.

17. The combination of claim 13 wherein the hook means comprises a member spanning and joined to the side plates, the member having a lip that cooperates with the side plates to form a pair of aligned spaces that receive the first barrier to enable the member to support the chute on the parts storage bin.

18. The combination of claim 13 wherein the hook means comprises an L-shaped extension on each side plate, each extension having a contact area that lies generally in the plane of the brace leg, the contact areas resting on the first barrier to support the chute on the parts storage bin.

19. The combination of claim 13 wherein the hook means comprises an L-shaped extension on each side plate, the extensions cooperating with the associated side plates to form a pair of aligned spaces that receive the first barrier when the hook means supports the chute on the parts storage bin.

20. The combination of claim 13 wherein the hook means comprises a pair of members each joined to a respective side plate, each member having a contact area that lies generally in the plane of the brace leg, the contact areas resting on the first barrier to support the chute on the parts storage bin.

21. The combination of claim 13 wherein the hook means comprises a pair of members each joined to a respective side plate, each member having a lip that cooperates with the respective side plate to form a space that receives the first barrier to enable the member to support the chute on the parts storage bin.

22. The combination of claim 13 wherein:
   a. the hook means is disengageable from the first barrier; and
   b. the floor first end is placeable in the first compartment and the brace leg is insertable into the first vertical spaces to cantilever support the chute on the storage bin with the chute floor making the predetermined angle with the first bottom wall,
      so that second selected components dropped onto the chute floor adjacent the second end thereof slide along the floor and onto the first bottom wall to fill the first compartment.

23. A method of filling a first selected compartment of a parts storage bin having multiple compartments each having a horizontal bottom wall, two vertical side partitions, an open front, and a barrier upstanding from the bottom wall that partially closes the open front and that cooperates with the side partitions to form a pair of vertical spaces, comprising the steps of:
   a. providing a bin filling chute having a floor with first and second ends, side plates upstanding from the floor, and a brace with a leg that defines a plane that makes a predetermined angle of approximately 55 degrees and 65 degrees with the floor;
   b. placing the chute floor first end inside the first selected compartment and the chute floor second end outside the first selected compartment;
   c. inserting the chute leg into the vertical spaces associated with the first selected compartment and thereby cantilever supporting the chute on the parts storage bin with the chute floor making the predetermined angle with the bottom wall of the first selected compartment;
   d. dropping first selected components onto the chute floor adjacent the second end thereof; and
   e. sliding the first components by gravity along the chute floor to the first end thereof and onto the bottom wall of the first selected compartment.

24. The method of claim 23 comprising the further steps of:
   a. removing the chute leg from the vertical spaces associated with the first selected compartment;
   b. placing the chute floor first end inside a second selected compartment and the chute floor second end outside the second selected compartment;
   c. inserting the chute leg into the vertical spaces associated with the second selected compartment and thereby cantilever supporting the chute on the parts storage bin with the chute floor making the predetermined angle with the bottom wall of the second selected compartment;
   d. dropping second selected components onto the chute floor adjacent the second end thereof; and
   e. sliding the second components by gravity along the chute floor to the second end thereof and onto the bottom wall of the second selected compartment.

25. A method of filling a first compartment of a parts storage bin having multiple rows of compartments each having a horizontal bottom wall, a pair of vertical side partitions, an open front, and a barrier upstanding from the bottom wall that partially closes the open front and that cooperates with the side partitions to form a pair of vertical spaces, comprising the steps of:
   a. providing a chute having a floor with first and second ends, side plates upstanding from the floor, a brace with a leg that defines a plane that makes a predetermined angle of between approximately 55 degrees and 65 degrees with the floor, and at least one hook that lies generally in the plane of the brace leg;
   b. placing the floor first end inside the first compartment, and placing the floor second end outside the first compartment;
   c. placing the chute brace leg against the vertical partitions of the first compartment and simultaneously engaging said at least one chute hook with the barrier of a second compartment directly above the first compartment;
   d. dropping first selected components onto the chute floor adjacent the second end thereof; and
   e. sliding the first components by gravity along the chute floor to the second end thereof and onto the bottom wall of the first selected compartment.

26. The method of claim 25 comprising the further steps of:
   a. disengaging said at least one hook from the barrier of the second compartment;
   b. placing the chute floor first end inside the second compartment and the chute floor second end outside the second compartment;
   c. placing the brace leg against the vertical partitions associated with the second compartment and thereby orienting the chute floor to make the predetermined angle with the second compartment bottom wall;
   d. inserting the chute brace leg into the vertical spaces associated with the second compartment and thereby cantilever supporting the chute on the parts storage bin;
   e. dropping second selected components onto the chute floor adjacent the second end thereof; and
   f. sliding the second components by gravity along the chute floor to the second end thereof and onto the bottom wall of the second compartment.

* * * * *